Jan. 27, 1942.   P. GOEDE ET AL   2,270,872
METHOD OF MAKING CERAMIC INSULATORS
Filed March 11, 1938
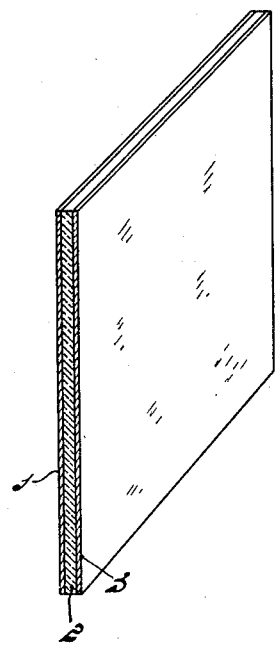
INVENTORS
PIETER GOEDE
LEONARDUS THEODORUS SCHEERMAN
MARINUS GERARD VAN BRUGGEN
EVERT JOHANNES WILLEM VERWEY
ROELOF DIRK BÜGEL
BY
ATTORNEY.

Patented Jan. 27, 1942

2,270,872

UNITED STATES PATENT OFFICE 2,270,872

METHOD OF MAKING CERAMIC INSULATORS

Pieter Goede, Leonardus Theodorus Scheerman, Marinus Gerard van Bruggen, Evert Johannes Willem Verwey, and Roelof Dirk Bügel, Eindhoven, Netherlands, assignors, by mesne assignments, to Hartford National Bank and Trust Company, Hartford, Conn., as trustee Application March 11, 1938, Serial No. 195,418
In the Netherlands April 6, 1937

2 Claims. (Cl. 25—157)

Our invention relates to a method of making ceramic insulators.

The main object of the invention is to produce a ceramic insulator, particularly for use as a dielectric for condensers, which has a dielectric loss-factor below $2 \times 10^{-3}$, as measured at a wavelength of 200 meters.

It is known in the ceramic art to make small plates, tubes, etc., of sintered titanium dioxide, for example by preliminarily heating the titanium dioxide, grinding the same into a powder, and then molding the powder together with an organic binder which, during the subsequent sintering-heating operation, is burnt out completely. We have found that, when working titanium dioxide into rigid ceramic bodies sintered to compactness, special precautions must be taken to obtain products having low dielectrical losses, and that even in the case of a quite cautiously performed oxidising-sintering operation the resulting products have such a high dielectric loss-factor that they are unsuited for many purposes, for example for use with condensers.

We have found that the dielectric loss-factor is influenced essentially by the manner of chilling subsequent to the sintering. According to the invention, we use titanium dioxide, the rutile modification of which has previously been recommended as a dielectric for condensers, and after the body formed therefrom has assumed upon chilling a temperature from about 1000° to 1100° C., we subsequently chill it at a rapid rate. More particularly, we subsequently chill the body at such a rapid rate that we obtain a dielectric loss-factor lower than $2 \times 10^{-3}$. This rapid chilling may be effected only until a temperature of about 700° C. is reached, as a rapid chilling to a lower temperature results in only slight variations in the dielectric-loss-factor.

As regards the oxidizing-sintering operation it must be borne in mind that in the ceramic field, it is common practice to use furnaces in which combustion gases are formed. As a result, the sintering of the material is effected within an atmosphere which is not formed solely of air but which contains to a greater or less extent combustion gases, or contaminating gases, of the furnace. Even if there is such a quantity of oxygen in relation to the contaminating gases that there is still an oxidizing-sintering atmosphere, dissociation of the titanium dioxide occurs with the formation of an electrically-conductive titanium oxide of a lower stage of valency. The more the atmosphere is contaminated with combustion gases, the lower will be the temperature at which this dissociation starts.

According to the invention, we suppress this dissociation of titanium dioxide, which is detrimental to the dielectric loss-factor, by allowing sufficient time to and affording opportunity for the body to reabsorb oxygen for reforming titanium dioxide. According to the invention, this is effected by chilling the body sufficiently slowly from the sintering temperature, i. e. between 1400 and 1500° C., down to a temperature at which the dissociation has started, or by maintaining the body for sufficiently long time at a temperature which is below the said temperature of dissociation, but at which the reaction speed is still sufficiently high to bring about the reformation.

It should be mentioned that the need for slow-chilling referred to above may, under certain unfavorable conditions, conflict with the need for rapid cooling from a temperature between about 1000 and 1100° C. down to at least 700° C. More particularly, if a lower titanium oxide has been formed to a marked extent, the temperature at which the dissociation starts may be sufficiently low to make it necessary to continue the slow-chilling from the sintering temperature down to a temperature which is very close to or even below 1000° to 1100° C., and as a result the obtainment of a satisfactory ultimate result becomes difficult or impossible. Such a condition may occur if the combustion gases of the furnace come into direct contact with the titanium dioxide to be sintered, as is often the case, for example, in continuous passing-through furnaces. Thus, we prefer to use indirect gas-heating, in which case the quantity of contaminating gases is limited to that which diffuses through the fire-proof wall separating the heating space from the gaseous atmosphere in which the titanium dioxide body to be sintered is placed. Thus, even in the case of indirect gas-heating, it is particularly advantageous to provide for supplementary air refreshment.

If the gas contamination in the oxidizing atmosphere is avoided or rendered impossible by special means, for example by heating in an electrical furnace having a platinum heating element, dissociation of titanium dioxide occurs not at all or to such a low extent that in the case of quick chilling in air, even from the sintering temperature down to ordinary temperatures the finished ceramic titanium dioxide body will still contain such a small amount of the lower titanium oxide that the dielectric loss-factor is smaller than $2 \times 10^{-3}$ as measured at a wave-length of 200 meters.

For the sake of completeness it must be mentioned that the invention can also be carried into effect with favorable results with a ceramic titanium dioxide body which has already been sintered without taking the above-mentioned special precautions. In such cases, we reheat the body in such manner that time is allowed to and opportunity is afforded for the oxygen present to diffuse inwardly for the re-formation of $TiO_2$ as set forth above. For this purpose, the body is heated for a sufficiently long time in a suitable oxidizing atmosphere at a temperature, for example of 1200° C., and is then subjected to a sufficiently quick chilling down to ordinary temperatures.

As we do not employ any of the ceramic auxiliary substances, that are detrimental to the dielectric constant, the ceramic dielectric obtained in accordance with the invention has the particular advantage of combining a low dielectric loss-factor with a particularly high dielectric constant. Thus, for example, a ceramic material having a dielectric constant of about 90 may be readily obtained.

As is well known, impurities such as alkaline compounds may exert a detrimental effect on the dielectric loss-factor. It is therefore desirable to start with a titanium dioxide commercial product whose purity is not too low, and also to prevent the absorption of such impurities from the surroundings during combustion.

In order that the invention may be clearly understood and readily carried into effect we shall describe the same in more detail with reference to several specific examples and to the accompanying drawing in which the single figure is a sectionized perspective view of a condenser having a dielectric according to the invention:

Example I

Titanium dioxide in its anatase modification is heated for about 15 minutes at 1300° C. to convert it into rutile. The sintered particles of rutile are crushed into a powder which is ground, with the addition of distilled water, in a ball-mill consisting of a hard type of porcelain of good dielectric properties. The titanium dioxide powder is then mixed with tragacanth and distilled water, and molded into small tubes and dried. The tubes thus formed are slipped into supporting cassettes of sintered pure alumina, and fired in a furnace of the continuous type in which the combustion gases are not maintained separated from the material being heated. The tubes are enclosed for about ten minutes in the hottest zone (about 1470° C.), and are then chilled in about half an hour down to a temperature of about 500° C., followed by chilling down to ordinary temperatures. The titanium dioxide tubes are then removed from the supporting cassettes and heated for about 10 minutes at a temperature of about 1200° C. in a tube furnace with indirect gas-heating, while providing an efficient air replacement in the tube. After this heating, the tubes are allowed to cool in air outside the furnace down to ordinary temperatures.

The resulting product has a dielectric loss-factor of from $0.7 \times 10^{-3}$ to $1.0 \times 10^{-3}$, as measured at a wave-length of 200 meters and a dielectric constant of about 90.

Example II

A small titanium dioxide plate, which has been formed and dried in the manner set forth in Example I, is suspended from a small alumina rod in a horizontally-arranged tube-furnace and heated for about ten minutes at 1470° C. with the use of indirect gas heating. The furnace is then allowed to cool down for 20 minutes to a temperature of about 1100° C., and the plate removed from the furnace and allowed to cool in air down to ordinary temperatures.

The resulting product has a dielectric loss-factor of about $0.3 \times 10^{-3}$ as measured at a wave-length of 200 meters and a dielectric constant of about 90.

Example III

A titanium dioxide body, which has been formed and dried in the manner described in Example I, is heated for ten minutes at 1470° C. in an indirectly gas-heated tube-furnace, whose two ends are opened and which is placed in an inclined position for the purpose of air replenishment. At the end of this time the body is removed slowly from the furnace so that it will cool in a few minutes down to 1100° C. in the cooler zones of the furnace. Alternatively the body may be quickly removed from the furnace and introduced into a small electric furnace having a nickel-chromium wire heating element and heated to 1000° C., where it remains for about 1 minute, and is then allowed to cool outside this furnace down to ordinary temperatures. If an efficient air current is blown through the furnace-tubes, the above cooling times may be further shortened.

The product thus obtained has a dielectric loss-factor of about $0.5 \times 10^{-3}$ as measured at a wave-length of 200 meters, and a dielectric constant of about 90.

Example IV

A titanium dioxide body, which has been formed and dried in the manner described in Example I, is heated for about ten minutes at 1470° C. in an electric furnace having a platinum wire heating element, after which it is allowed to cool outside the furnace down to ordinary temperatures.

The product thus obtained has a dielectric loss factor of about $1.3 \times 10^{-3}$ as measured at a wave-length of 200 meters, and a dielectric constant of 90.

The condenser illustrated in the drawing comprises two electrodes I and 3 of suitable metal separated by a thin layer of dielectric material 2 made in the manner described in the above examples.

While we have described our invention in connection with specific examples and applications, we do not wish to be limited thereto but desire the appended claims to be construed as broadly as permissible in view of the prior art.

What we claim is:

1. A method of manufacturing a ceramic insulator comprising the steps of forming a titanium dioxide body substantially free from a lower titanium oxide, sintering the body to compactness in an oxidising atmosphere and at a temperature between 1400° C. and 1500° C., cooling the body to a temperature of about 1100° C. and rapidly cooling the body from a temperature of at least about 1100° C. to keep the dielectric loss factor smaller than $2 \times 10^{-3}$ as measured at a wave-length of 200 meters.

2. A method of manufacturing a ceramic insulator comprising the steps of forming a titanium dioxide body substantially free from electrically-conductive titanium oxide of a lower stage of valency, sintering the body to compactness in an oxidizing atmosphere and at a temperature between 1400° C. and 1500° C., cooling the body to a temperature of about 1100° C. and rapidly cooling the body from a temperature of at least about 1100° C. to a temperature of less than about 700° C. to keep the dielectric loss factor smaller than $2 \times 10^{-3}$ as measured at a wave-length of 200 meters.

PIETER GOEDE.
LEONARDUS THEODORUS SCHEERMAN.
MARINUS GERARD van BRUGGEN.
EVERT JOHANNES WILLEM VERWEY.
ROELOF DIRK BÜGEL.